United States Patent
Simmons-Edler et al.

(10) Patent No.: US 11,710,301 B2
(45) Date of Patent: Jul. 25, 2023

(54) APPARATUS FOR Q-LEARNING FOR CONTINUOUS ACTIONS WITH CROSS-ENTROPY GUIDED POLICIES AND METHOD THEREOF

(71) Applicant: SAMSUNG ELECTRONICS CO., LTD., Suwon-si (KR)

(72) Inventors: Riley Simmons-Edler, Princeton, NJ (US); Ben Eisner, New York, NY (US); Eric Mitchell, Stanford, CA (US); Daniel Dongyuel Lee, Tenafly, NJ (US); Sebastian Seung, Princeton, NJ (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 759 days.

(21) Appl. No.: 16/749,658

(22) Filed: Jan. 22, 2020

(65) Prior Publication Data
US 2020/0250493 A1 Aug. 6, 2020

Related U.S. Application Data

(60) Provisional application No. 62/802,149, filed on Feb. 6, 2019.

(51) Int. Cl.
*G06V 10/82* (2022.01)
*G06N 5/043* (2023.01)
(Continued)

(52) U.S. Cl.
CPC ............. *G06V 10/82* (2022.01); *G06N 3/006* (2013.01); *G06N 3/045* (2023.01); *G06N 3/08* (2013.01);
(Continued)

(58) Field of Classification Search
CPC ...... G06N 3/08; G06N 3/0454; G06N 3/0472; G06N 5/043; G06N 3/006; G06N 3/045;
(Continued)

(56) References Cited

U.S. PATENT DOCUMENTS 10,733,502 B2 * 8/2020 Nachum .................. G06N 3/08
10,860,926 B2 * 12/2020 Xu .......................... G06N 3/006
(Continued)

FOREIGN PATENT DOCUMENTS

KR 10-1926403 B1 12/2018

OTHER PUBLICATIONS

Gu, et al. (Continuous Deep Q-Learning with Model-based Acceleration), pp. 1-10 (Year: 2016).*
(Continued)

*Primary Examiner* — Daniel G Mariam
(74) *Attorney, Agent, or Firm* — Sughrue Mion, PLLC

(57) ABSTRACT

An apparatus for performing continuous actions includes a memory storing instructions, and a processor configured to execute the instructions to obtain a first action of an agent, based on a current state of the agent, using a cross-entropy guided policy (CGP) neural network, and control to perform the obtained first action. The CGP neural network is trained using a cross-entropy method (CEM) policy neural network for obtaining a second action of the agent based on an input state of the agent, and the CEM policy neural network is trained using a CEM and trained separately from the training of the CGP neural network.

16 Claims, 7 Drawing Sheets

(51) Int. Cl.
*G06N 3/08* (2023.01)
*G06N 3/045* (2023.01)
*G06N 3/006* (2023.01)
*G06V 10/764* (2022.01)
*G06V 10/778* (2022.01)
*G06V 10/80* (2022.01)

(52) U.S. Cl.
CPC ........... *G06N 5/043* (2013.01); *G06V 10/764* (2022.01); *G06V 10/7788* (2022.01); *G06V 10/811* (2022.01)

(58) Field of Classification Search
CPC .... G06V 10/82; G06V 10/764; G06V 10/811; G06V 10/7788
See application file for complete search history.

(56) References Cited

U.S. PATENT DOCUMENTS

| | | |
|---|---|---|
| 11,132,211 B1 * | 9/2021 | Tang ..................... B60W 60/00 |
| 2017/0249547 A1 | 8/2017 | Shrikumar et al. |
| 2018/0082172 A1 | 3/2018 | Patel et al. |
| 2019/0065948 A1 | 2/2019 | Henry |
| 2019/0122654 A1 | 4/2019 | Song et al. |
| 2019/0172207 A1 | 6/2019 | Odry et al. |

OTHER PUBLICATIONS

Khan, et al. (Training an Agent for FPS Doom Game using Visual Reinforcement Learning and VizDoom), pp. 32-41 (Year: 2017).*

* cited by examiner

APPARATUS FOR Q-LEARNING FOR CONTINUOUS ACTIONS WITH CROSS-ENTROPY GUIDED POLICIES AND METHOD THEREOF

CROSS-REFERENCE TO RELATED APPLICATION

This application claims priority from U.S. Provisional Patent Application No. 62/802,149, filed on Feb. 6, 2019, in the U.S. Patent and Trademark Office, the disclosure of which is incorporated herein by reference in its entirety.

BACKGROUND

1. Field

The disclosure relates to reinforcement learning (RL), and more particularly, to an apparatus for Q-learning for continuous actions with cross-entropy guided policies and a method thereof.

2. Description of Related Art

Off-Policy RL is a class of methods for many problem domains, such as robotics, in which the cost of collecting data is high and on-policy methods are consequently intractable. Standard methods for applying Q-learning to continuous-valued action domains involve iteratively sampling a Q-function to find a good action (e.g., via hill-climbing), or by learning a policy network at the same time as the Q-function such that the policy network is dependent on the Q-function (e.g., deep deterministic policy gradients (DDPG)). Both approaches make tradeoffs between stability, speed, and accuracy.

In detail, model-free deep RL algorithms have demonstrated the capacity to learn sophisticated behavior in complex environments. Starting with Deep Q-Networks (DQN) achieving human-level performance on video games, deep RL has led to impressive results in several classes of challenging tasks. While many deep RL methods were initially limited to discrete action spaces, there has since been substantial interest in applying deep RL to continuous action domains. In particular, deep RL has increasingly been studied for use in continuous control problems, both in simulated environments and on robotic systems in the real world.

A number of challenges exist for practical control tasks such as robotics. For tasks involving a physical robot where on-robot training is desired, the physical constraints of robotic data collection render data acquisition costly and time-consuming. Thus, the use of off-policy methods like Q-learning has been studied, as data collected during development or by human demonstrators can be used to train the final system, and data can be re-used during training. However, even when using off-policy Q-learning methods for continuous control, several other challenges remain. In particular, training stability across random seeds, hyperparameter sensitivity, and runtime are all challenges that are both relatively understudied and are factors for practical use.

Inconsistency across runs, e.g. due to different random initializations, is an issue in many domains of deep RL, as it makes it difficult to debug and evaluate an RL system. DDPG, an off-policy Q-learning method, has been repeatedly characterized as unstable. While some work has improved stability in off-policy Q-learning, there remains significant room for improvement. Sensitivity to hyperparameters (i.e. batch size, network architecture, learning rate, etc.) is an issue when system evaluation is expensive, since debugging and task-specific tuning are difficult and time consuming to perform. Further, many real robotics tasks have strict runtime and hardware constraints (i.e. interacting with a dynamic system), and any RL control method applied to these tasks have to be fast enough to compute in real time.

SUMMARY

According to embodiments, an apparatus for performing continuous actions includes a memory storing instructions, and a processor configured to execute the instructions to obtain a first action of an agent, based on a current state of the agent, using a cross-entropy guided policy (CGP) neural network, and control to perform the obtained first action. The CGP neural network is trained using a cross-entropy method (CEM) policy neural network for obtaining a second action of the agent based on an input state of the agent, and the CEM policy neural network is trained using a CEM and trained separately from the training of the CGP neural network.

The CGP neural network may be trained by obtaining a loss based on the first action and the second action, and by updating a parameter of the CGP neural network, based on the obtained loss.

In the CEM used to train the CEM policy neural network, outputs of the CEM policy neural network may be sampled and used to parameterize the CEM policy neural network.

The CGP neural network may be trained separately from a training of a Q-function neural network for obtaining an output Q-value corresponding to an expected return of taking an input action.

The Q-function neural network may be trained using the CEM, and in the CEM used to train the Q-function neural network, outputs of the Q-function neural network may be sampled and used to parameterize the Q-function neural network.

According to embodiments, an apparatus for performing continuous actions includes a memory storing instructions, and a processor configured to execute the instructions to obtain an action of an agent, based on a current state of the agent, using a q-gradient guided policy (QGP) neural network, and control to perform the obtained action. The QGP neural network is trained using a Q-function neural network for obtaining a Q-value corresponding to an expected return of taking the action, and the Q-function neural network is trained separately from the training of the QGP neural network.

The QGP neural network may be trained by obtaining a loss based on the Q-value, and by updating a parameter of the QGP neural network, based on the obtained loss.

The loss may be a negative value of the Q-value.

The Q-function neural network may be trained using a cross-entropy method (CEM), and in the CEM used to train the Q-function neural network, outputs of the Q-function neural network may be sampled and used to parameterize the Q-function neural network.

According to embodiments, a method of performing continuous actions includes obtaining a first action of an agent, based on a current state of the agent, using a cross-entropy guided policy (CGP) neural network, and controlling to perform the obtained first action. The CGP neural network is trained using a cross-entropy method (CEM) policy neural network for obtaining a second action of the agent based on an input state of the agent, and the CEM policy neural network is trained using a CEM and trained separately from the training of the CGP neural network.

The CGP neural network may be trained by obtaining a loss based on the first action and the second action, and by updating a parameter of the CGP neural network, based on the obtained loss.

In the CEM used to train the CEM policy neural network, outputs of the CEM policy neural network may be sampled and used to parameterize the CEM policy neural network.

The CGP neural network may be trained separately from a training of a Q-function neural network for obtaining an output Q-value corresponding to an expected return of taking an input action.

The Q-function neural network may be trained using the CEM, and in the CEM used to train the Q-function neural network, outputs of the Q-function neural network may be sampled and used to parameterize the Q-function neural network.

A non-transitory computer-readable storage medium may store instructions to cause a processor to perform the method.

A method of performing continuous actions includes obtaining an action of an agent, based on a current state of the agent, using a q-gradient guided policy (QGP) neural network, and controlling to perform the obtained action. The QGP neural network is trained using a Q-function neural network for obtaining a Q-value corresponding to an expected return of taking the action, and the Q-function neural network is trained separately from the training of the QGP neural network.

The QGP neural network may be trained by obtaining a loss based on the Q-value, and by updating a parameter of the QGP neural network, based on the obtained loss.

The loss may be a negative value of the Q-value.

The Q-function neural network may be trained using a cross-entropy method (CEM), and in the CEM used to train the Q-function neural network, outputs of the Q-function neural network may be sampled and used to parameterize the Q-function neural network.

A non-transitory computer-readable storage medium may store instructions to cause a processor to perform the method.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects and features of embodiments of the disclosure will be more apparent from the following description taken in conjunction with the accompanying drawings, in which.

DETAILED DESCRIPTION

Figure 1:
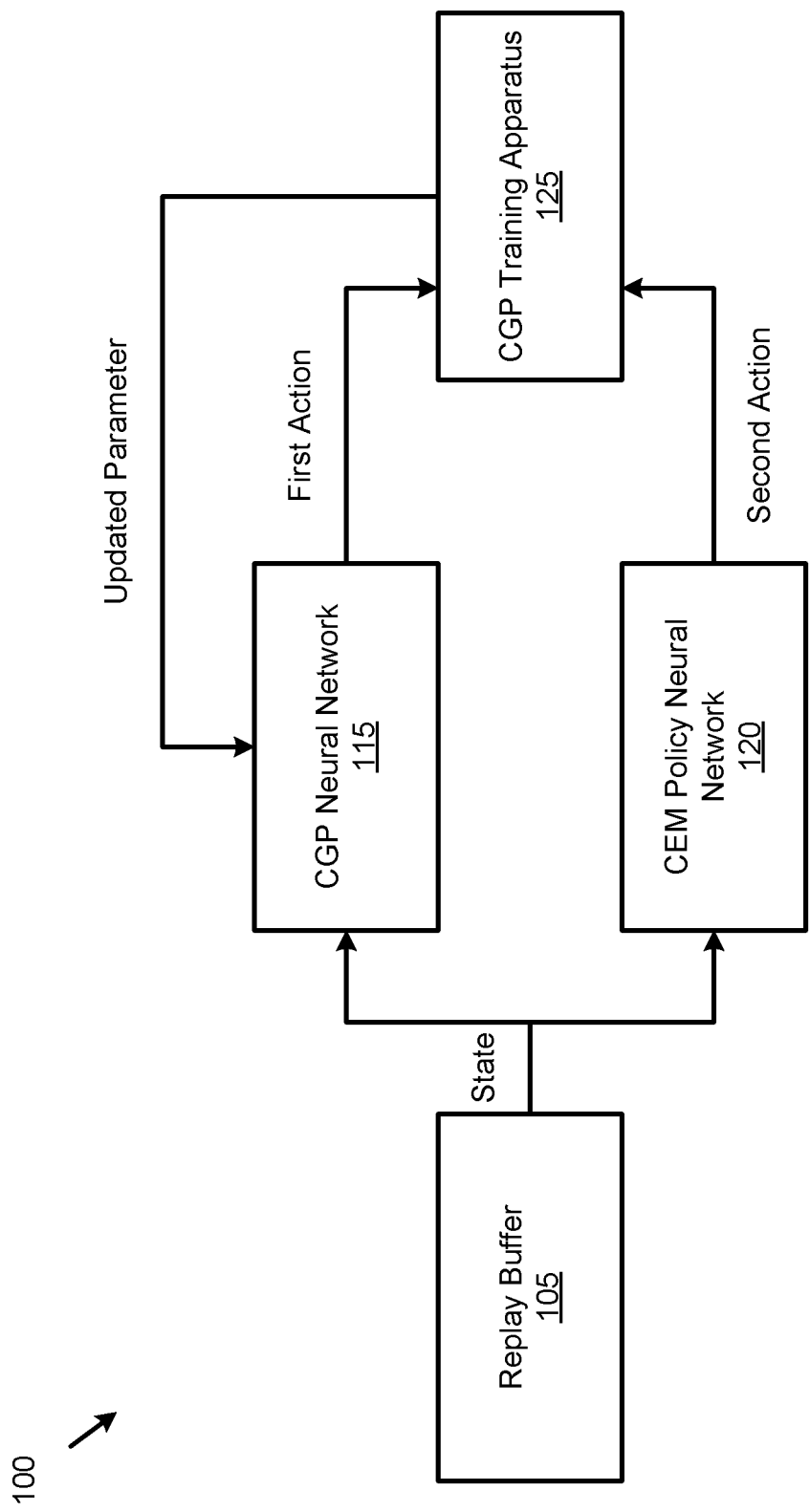
FIG. 1 is a block diagram of an apparatus for training a cross-entropy guided policy (CGP) neural network, according to embodiments.

Embodiments of the disclosure provide an apparatus for Q-learning for continuous actions with cross-entropy guided policies and a method thereof. The method includes training a Q-function using iterative sampling of actions with a heuristic cross-entropy method (CEM), while training a deterministic neural network policy in parallel to imitate CEM's sampling behavior. This trained policy is then used at inference time for fast and precise evaluation without the expensive sample iteration of conventional policy network methods.

The above method is more stable to train (i.e., displays lower variance) across different training runs, hyperparameter combinations and tasks, than the conventional policy network methods, while preserving equivalent inference time compute costs over a sample-based policy at the inference time, and achieving competitive and accurate total reward on standard continuous-control benchmark tasks. Accordingly, the method described herein is well-suited for real-world robotics tasks and other time/computer sensitive applications.

As the disclosure allows for various changes and numerous examples, the embodiments will be illustrated in the drawings and described in detail in the written description. However, this is not intended to limit the disclosure to modes of practice, and it will be understood that all changes, equivalents, and substitutes that do not depart from the spirit and technical scope of the disclosure are encompassed in the disclosure.

In the description of the embodiments, detailed explanations of related art are omitted when it is deemed that they may unnecessarily obscure the essence of the disclosure. Also, numbers (for example, a first, a second, and the like) used in the description of the specification are identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "unit" or a "module," two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the present specification, an 'image' or a 'picture' may denote a still image, a moving image including a plurality of consecutive still images (or frames), or a video.

Also, in the present specification, a deep neural network (DNN) or convolutional neural network (CNN) is a representative example of an artificial neural network model simulating brain nerves, and is not limited to an artificial neural network model using an algorithm.

Also, in the present specification, a 'parameter' is a value used in an operation process of each layer forming a neural network, and for example, may include a weight used when an input value is applied to an operation expression. Here, the parameter may be expressed in a matrix form. The parameter is a value set as a result of training, and may be updated through separate training data when necessary.

Throughout the disclosure, the expression "at least one of a, b or c" indicates only a, only b, only c, both a and b, both a and c, both b and c, all of a, b, and c, or variations thereof.

FIG. 1 is a block diagram of an apparatus 100 for training a CGP neural network 115, according to embodiments.

As shown in FIG. 1, the apparatus 100 includes a replay buffer 105, the CGP neural network 115, a CEM policy neural network 120 and a CGP training apparatus 125.

The replay buffer 105 obtains and outputs a current state of an agent. The replay buffer 105 stores a history of states of the agent. The agent may be, for example, a robot.

The state may be obtained from a data storage medium including a magnetic medium such as a hard disk, a floppy disk, or a magnetic tape, an optical recording medium such as CD-ROM or DVD, or a magneto-optical medium such as a floptical disk. The state may also be obtained from an input interface including, for example, a touchscreen, a camera, a microphone, a keyboard, a mouse or any combination thereof.

The CGP neural network 115 obtains the state of the agent, from the replay buffer 105, and obtains a first action of the agent, based on the obtained state of the agent. The CGP neural network 115 is configured to be a policy of the agent, and be used to infer an output action of the agent, based on an input state of the agent.

The CGP neural network 115 is trained separately from training of a Q-function neural network that is configured to infer an output Q-value corresponding to an expected return of taking an input action of the agent in a state of the agent. The Q-function neural network may be pre-trained using a CEM described below.

The CEM policy neural network 120 obtains the state of the agent, from the replay buffer 105, and obtains a second action of the agent, based on the obtained state of the agent. Like the CGP neural network 115, the CEM policy neural network 120 is configured to infer the output action of the agent, based on the input state of the agent. Unlike the CGP neural network 115, however, the CEM policy neural network 120 is pre-trained using the CEM described below. The CEM policy neural network 120 is further pre-trained separately from the training of the CGP neural network 115.

The CEM includes training a neural network by sampling outputs of the neural network, and obtaining a top number of the sampled outputs. A mean or variance of the obtained top number of the sampled outputs may be obtained and used to parameterize the neural network. The above operations are then iteratively performed again with another top number of sampled outputs of the neural network.

The CGP training apparatus 125 obtains the first action from the CGP neural network 115, and obtains the second action from the CEM policy neural network 120. The CGP training apparatus 125 obtains a loss based on the obtained first action and the obtained second action. The loss may be a square of an absolute difference between the obtained first action and the obtained second action.

The CGP training apparatus 125 updates a parameter of the CGP neural network 115, based on the obtained loss. That is, the policy corresponding to the CGP neural network 115 is regressed on an L2-norm between the policy corresponding to the CGP neural network 115 and a policy corresponding to the CEM policy neural network 120.

Based on the CGP neural network 115 being trained, at inference time, the CGP neural network 115 may be the policy of the agent, and be used to infer the output action of the agent, based on the input state of the agent. The inference time refers to a time after the training of the CGP neural network 115 and at which the CGP neural network 115 is used.

By training the CGP neural network 115 separately from the training of the CEM policy neural network 120 and the Q-function neural network, the training of the CGP neural network 115 is more stable than training these neural networks together to depend on each other. Further, by training the CGP neural network 115 based on the trained CEM policy neural network 120, there is a computational benefit at the inference time because CEM sampling no longer has to be performed at the inference time and is performed only during training.

In detail, a notation of an RL task is defined as follows. RL is a class of algorithms for solving Markov Decision Problems (MDPs) that may be phrased in a finite time horizon case as an agent characterized by a policy $\pi$ taking actions $a_t$ in an environment, with an objective of maximizing an expected total reward value $\mathbb{E} \Sigma_{t-1}^{T} \gamma r(s_t, a_t)$ that the agent receives over timestamps $t \in \{1 \ldots T\}$ with some time decay factor per timestamp $\gamma$. To achieve this, an optimal policy $\pi^*$ is obtained that maximizes Equation 1 below:

$$J(\pi) = \mathbb{E}_{s,a \sim \pi}[\Sigma_{t=1}^{T} \gamma r(s_t, a_t)]. \qquad \text{(Equation 1)}$$

A class of algorithms for solving this is Q-learning that attempts to find an optimal policy by finding Equation 2 below:

$$Q*(s_t, a_t) = r(s_t, a_t) + \gamma \max_{a_{t+1}}(Q*(s_{t+1}, a_{t+1})), \qquad \text{(Equation 2)}$$

which satisfies the Bellman equation shown as Equation 3 below:

$$Q(s,a) = r(s,a) + \mathbb{E}[Q(s',a')], a' \sim \pi^* s'). \qquad \text{(Equation 3)}$$

Once an optimal Q-function $Q^*$ is known, the optimal policy $\pi^*$ can be defined as $\pi^*(s) = \text{argmax}_a(Q^*(s,a))$. Q-learning attempts to learn a Q-function $Q_\theta$ that converges to the optimal Q-function $Q^*$, where $\theta$ are parameters to a neural network. The Q-function $Q_\theta$ may be learned through bootstrapping, wherein Equation 4 below is minimized:

$$J(\theta) = \mathbb{E}_{s,a}\left[\left(Q_\theta - \left[r(s, a) + \gamma \max_{a'}(\hat{Q}(s', a'))\right]\right)^2\right], \qquad \text{(Equation 4)}$$

where $\hat{Q}$ is a target Q-function that may be assumed to be a time delayed version of a current Q-function $\hat{Q}_{\hat{\theta}}$.

To use the above equation, a policy $\pi(s)$ that computes $\text{argmax}_a(Q(s,a))$ may be defined. In discrete action spaces, the policy $\pi(s)$ is trivial, since $\text{argmax}_a$ can be computed exactly evaluating each possible action a with the Q-function Q. In continuous-valued action spaces, such a computation is intractable. Further, as most neural network Q-functions are highly non-convex, an analytical solution is unlikely to exist.

Accordingly, the embodiments described herein include first using a sampling-based optimizer to optimize inputs to a Q-function that is used as a policy, to train the Q-function via Q-learning. Then, a deterministic policy is trained separately from the Q-function.

First, a sampling-based optimizer computes approximately optimal actions with respect to a given Q-function and a given state s. A policy $\pi_{s_Q}(s) = S_Q(s)$ is defined, where $S_Q$ is the sampling-based optimizer that approximates $\text{argmax}_a(Q(s,a))$ for an action a and the state s. Then, a Q-function $Q_\theta$ is trained and parameterized by weights of a neural network, using Q-learning to minimize Equation 5 below:

$$J(\theta)=\mathbb{E}_{s,a}[(Q_\theta-[r(s,a)+\gamma\cdot\hat{Q}(s',\pi s_{Q_\theta}(s'))])^2]. \quad \text{(Equation 5)}$$

A choice of the sampling-based optimizer $S_Q$ can impact a quality of the policy it induces, and therefore impact a quality of the Q-function $Q_\theta$ after training. For example, the sampling-based optimizer $S_Q$ may be trained using a CEM. In the CEM, each action vector is represented as a collection of independent Gaussian distributions, initially with mean $\mu=1$ and standard deviation $\sigma=1$. These variables are sampled n times to produce action vectors $a_0, a_1, \ldots, a_{n-1}$, which are then scored by the Q-function Q. Top k-scoring action vectors are then used to reparameterize the Gaussian distributions, and this process is repeated N times. For brevity, the resulting policy may be referred as $\pi_{CEM}$. The full CEM can be found in Algorithm 1 below:

---
Algorithm 1 Cross Entropy Method Policy ($\pi_{CEM}$) for Q-Learning

Input: state s, Q-function Q, iterations N, samples n, winners k, action dimension d
$\mu \leftarrow 0^d$
$\sigma^2 \leftarrow 1^d$
for t = 1 to N do
   $A \leftarrow \{a_i : a_i \overset{i.i.d.}{\sim} \mathcal{N}(\mu, \sigma^2)\}$
   $\tilde{A} \leftarrow \{\tilde{a}_i : \tilde{a}_i = \tanh(a_i)\}$
   $Q \leftarrow \{q_i : q_i = Q(\tilde{a}_i)\}$
   $I \leftarrow \{\text{sort}(Q)_i : i \in [1, \ldots, k]\}$
   $\mu \leftarrow \frac{1}{k}\sum_{i \in I} a_i$
   $\hat{\sigma}^2 \leftarrow \text{Var}_{i \in I}(a_i)$
   $\sigma^2 \leftarrow \hat{\sigma}^2$
end for
return $\tilde{a}^* \in \tilde{A}$ such that $Q(\tilde{a}^*) = \max_{i \in I} Q(\tilde{a}_i)$

---

The embodiments described herein may extend the CEM policy $\pi_{CEM}$ by training a deterministic neural network policy $\pi_\phi(s)$ to predict an approximately optimal action at inference time, while using the CEM policy $\pi_{CEM}$ to sample training data from the environment and to select bootstrap actions for training the Q-function.

A single evaluation of the policy $\pi_\phi$ is much less expensive to compute than multiple iterations of Q-function evaluations to determine the CEM policy $\pi_{CEM}$. Even when evaluating CEM samples with unbounded parallel compute activity, a nature of iterative sampling imposes a serial bottleneck that means a theoretical best-case runtime performance of the CEM policy $\pi_{CEM}$ will be N times slower than that of the policy $\phi_\phi$. Additionally, as the CEM policy $\pi_{CEM}$ is inherently noisy, by training the policy $\pi_\phi$ on many approximately optimal actions from the CEM policy $\pi_{CEM}(s)$ evaluated on states from a replay buffer (e.g., the replay buffer 105), for a given state s and a given Q-function $Q_\theta$, the policy $\pi_\phi$ will converge to a mean of the samples from the CEM policy $\pi_{CEM}$, reducing policy noise at the inference time.

Referring again to FIG. 1, the deterministic neural network policy $\pi_\phi$ (e.g., of the CGP neural network 115) may be trained using an L2 regression objective as shown in Equation 6 below:

$$J(\phi)=\mathbb{E}_{s_t \sim \pi_{CEM}}(\nabla_{\pi_\phi}\|\pi_\phi(s_t)-\pi_{CEM}(s_t)\|^2). \quad \text{(Equation 6)}$$

Equation 6 is used to train the policy $\pi_\phi$ to imitate an output of the CEM policy $\pi_{CEM}$ (e.g., of the CEM policy neural network 120) without relying on the CEM for sampling and a Q-function $Q_\theta$ (e.g., of the Q-function neural network) at inference time. If it is assumed that the CEM policy $\pi_{CEM}$ is an approximately optimal policy for the given Q-function $Q_\theta$, Equation 6 converges to a global maxima of the Q-function $Q_\theta$, and avoids a local maxima issue.

Figure 2:
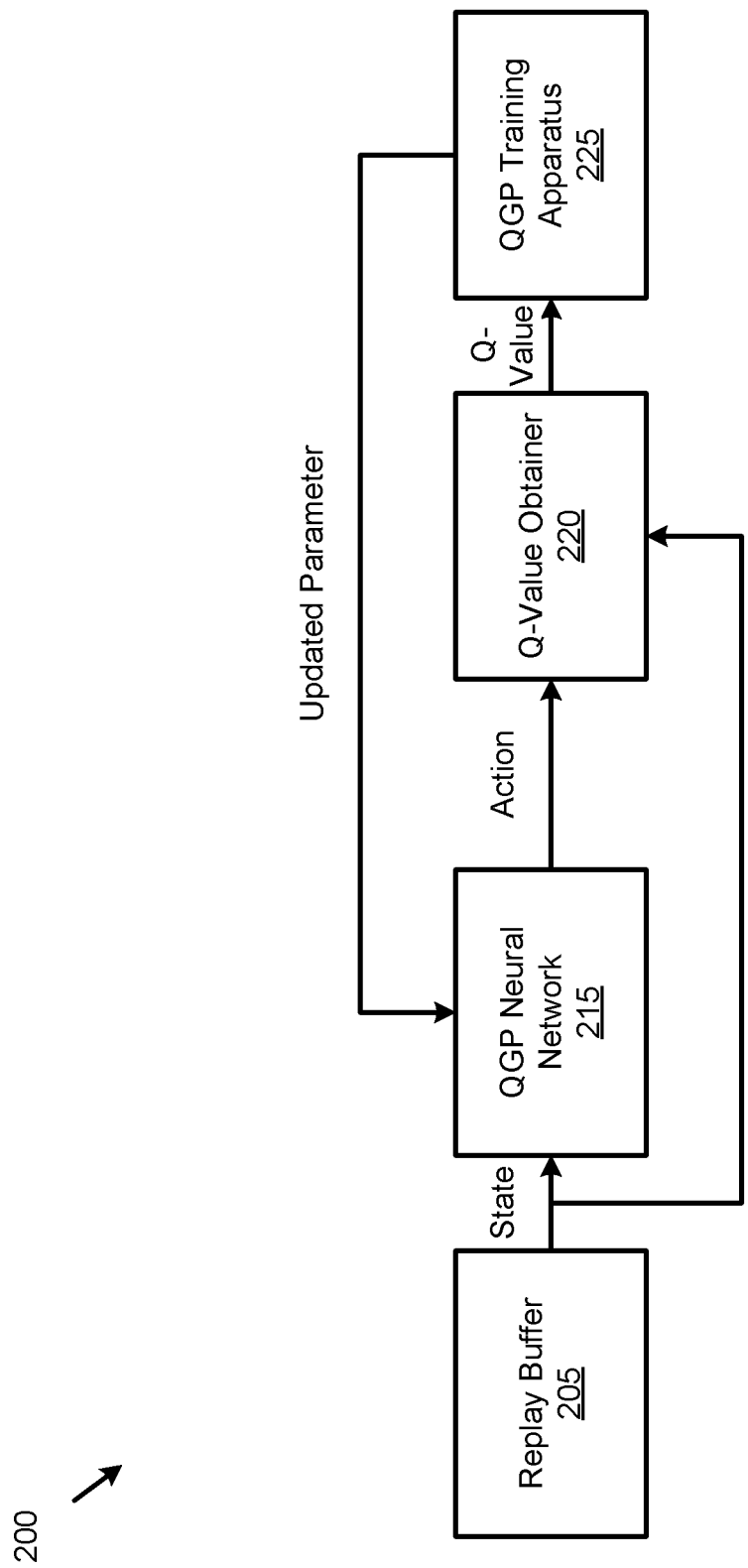
FIG. 2 is a block diagram for an apparatus for training a q-gradient guided policy (QGP) neural network, according to embodiments.

FIG. 2 is a block diagram for an apparatus 200 for training a QGP neural network 215, according to embodiments.

As shown in FIG. 2, the apparatus 200 includes a replay buffer 205, the QGP neural network 215, a Q-value obtainer 220 and a QGP training apparatus 225.

The replay buffer 205 obtains and outputs a current state of an agent. The replay buffer 205 stores a history of states of the agent. The agent may be, for example, a robot.

The state may be obtained from a data storage medium including a magnetic medium such as a hard disk, a floppy disk, or a magnetic tape, an optical recording medium such as CD-ROM or DVD, or a magneto-optical medium such as a floptical disk. The state may also be obtained from an input interface including, for example, a touchscreen, a camera, a microphone, a keyboard, a mouse or any combination thereof.

The QGP neural network 215 obtains the state of the agent, from the replay buffer 105, and obtains an action of the agent, based on the obtained state of the agent. The QGP neural network 215 is configured to be a policy of the agent, and be used to infer an output action of the agent, based on an input state of the agent.

The QGP neural network 215 is trained separately from training of a Q-function neural network that is configured to infer an output Q-value corresponding to an expected return of taking an input action of the agent in a state of the agent. The Q-function neural network may be pre-trained using the CEM.

The Q-value obtainer 220 obtains the action of the agent, from the QGP neural network 215, and obtains a Q-value corresponding to an expected return of taking the obtained action of the agent, using the Q-function neural network trained separately from the training of the QGP neural network 215.

The QGP training apparatus 225 obtains the Q-value from the Q-value obtainer 220, and obtains a loss based on the obtained Q-value. The loss may be a negative value of the obtained Q-value.

The QGP training apparatus 225 updates a parameter of the QGP neural network 215, based on the obtained loss. That is, the policy corresponding to the QGP neural network 215 is trained to maximize the Q-value given a state of the agent by directly performing gradient ascent on the Q-value.

Based on the QGP neural network 215 being trained, at inference time, the QGP neural network 215 may be the policy of the agent, and be used to infer the output action of the agent, based on the input state of the agent. The inference time refers to a time after the training of the QGP neural network 215 and at which the QGP neural network 215 is used. At the inference time, the QGP neural network 215 may be an alternative option to the CGP neural network 115 described with respect to FIG. 1.

By training the QGP neural network 215 separately from the training of the Q-function neural network, the training of the QGP neural network 215 is more stable than training these neural networks together to depend on each other. Further, by training the QGP neural network 215 based on the trained Q-function neural network, there is a computational benefit at the inference time because CEM sampling no longer has to be performed at the inference time and is performed only during training.

In detail, a deterministic neural network policy $\pi_\phi$ (e.g., of the QGP neural network 215) may be learned using Equation 7 below:

$$J(\phi) = \mathbb{E}_{s \sim \rho^{\pi_{CEM}}}(\nabla_{\pi_\phi} Q_\theta(s, \pi_\phi(s))). \quad \text{(Equation 7)}$$

Equation 7 is used to optimize weights $\phi$ of the policy using a Q-function $Q_\theta$ and replay data collected by a CEM policy $\pi_{CEM}$. This is a gradient of the policy with respect to a Q-value, and an optimal Q-value should converge to an optimal policy. Because the learned policy is not used during the training of a Q-function, but uses gradients from the Q-value to learn an optimal policy, this configuration may be referred as QGP. Policies trained in this fashion may be referred as $\pi_{QGP}$. The policy $\pi_{QGP}$ is trained to convergence on a fixed Q-function (e.g., the trained Q-function neural network) and a replay buffer (e.g., the replay buffer 205).

Referring to FIGS. 1 and 2, the training of the CGP and QGP is compatible with any Q-learning algorithm. To improve performance and training stability, the training of the CGP and QGP may be implemented in a Q-learning algorithm in which a second, additional Q-function is used for target Q-value computation to minimize approximation error. The full CGP and QGP method using two Q-functions can found in Algorithm 2 below:

---

Algorithm 2 CGP: Cross-Entropy Guided Policies

TRAINING
Initialize Q-functions $Q_{\theta_1}$, $Q_{\theta_2}$ and policy $\pi_\phi$ with random parameters $\theta_1$, $\theta_2$, $\phi$, respectively
Initialize target networks $\theta'_1 \leftarrow \theta_1$, $\theta'_2 \leftarrow \theta_2$, $\phi' \leftarrow \phi$
Initialize CEM policies $\pi_{CEM}{}^Q{}_{\theta_1}$, $\pi_{CEM}{}^Q{}_{\theta'_1}$
Initialize replay buffer B
Define batch size b
for e = 1 to E do
    for t = 1 to T do
        Step in environment:
        Observe state $s_t$
        Select action $\alpha_t \sim \pi_{CEM}{}^Q{}_{\theta_1}(s_t)$
        Observe reward $r_t$, new state $s_{t+1}$
        Save step $(s_t, \alpha_t, r_t, s_{t+1})$ in B
        Train on replay buffer (j ∈ 1,2):
        Sample minibatch $(s_i, \alpha_i, r_i, s_{i+1})$ of size b from B
        Sample actions $\tilde{\alpha}_{i+1} \sim \pi_{CEM}{}^{\theta'}{}_1$
        Compute $q^* = r_i + \gamma \min_{j \in 1,2} Q_{\theta'_j}(s_{i+1}, \tilde{\alpha}_{i+1})$
        Compute losses $l_{Q_j} = (Q_{\theta_j}(s_i, \alpha_i) - q^*)^2$
        CGP loss: $l_\pi{}^{CGP} = (\pi_\phi(s_i) - \pi_{CEM}{}^{\theta}{}_1(s_i))^2$
        QGP loss: $l_\pi{}^{QGP} = -Q_{\theta_1}(s_i, \pi_\phi(s_i))$
        Update $\theta_j \leftarrow \theta_j - \eta_Q \nabla_{\theta_j} l_{Q_j}$
        Update $\phi \leftarrow \phi - \eta_\pi \nabla_\phi l_\pi$
        Update target networks:
        $\theta'_j \leftarrow T\theta_j + (1 - T)\theta'_j$, j ∈ 1,2
        $\phi' \leftarrow T\phi + (1 - T)\phi'$
    end for
end for
INFERENCE
for t = 1 to T do
    Observe state $s_t$
    Select action $\alpha_t \sim \pi_\phi(s_t)$
    Observe reward $r_t$, new state $s_{t+1}$
end for

---

In FIGS. 1 and 2, each of the replay buffer 105, the CGP training apparatus 125, the replay buffer 205, the Q-value obtainer 220 and the QGP training apparatus 225 may be implemented through a dedicated processor or through a combination of software and general-purpose processor such as application processor (AP), central processing unit (CPU) or graphic processing unit (GPU). The dedicated processor may be implemented by including a memory for implementing embodiments of the disclosure or by including a memory processor for using an external memory.

Also, each of the replay buffer 105, the CGP training apparatus 125, the replay buffer 205, the Q-value obtainer 220 and the QGP training apparatus 225 may be configured by a plurality of processors. In this case, each of the replay buffer 105, the CGP training apparatus 125, the replay buffer 205, the Q-value obtainer 220 and the QGP training apparatus 225 may be implemented through a combination of dedicated processors or through a combination of software and general-purpose processors such as AP, CPU or GPU.

Further, each of the replay buffer 105, the CGP training apparatus 125, the replay buffer 205, the Q-value obtainer 220 and the QGP training apparatus 225 may include a CPU, a memory, and a computer program including instructions. The computer program is stored in the memory. The replay buffer 105, the CGP training apparatus 125, the replay buffer 205, the Q-value obtainer 220 and the QGP training apparatus 225 may respectively perform functions described with reference to FIGS. 1 and 2 according to execution of the computer program by the CPU. The functions described with reference to FIGS. 1 and 2 are performed by a dedicated hardware chip and/or the CPU.

Figure 3:
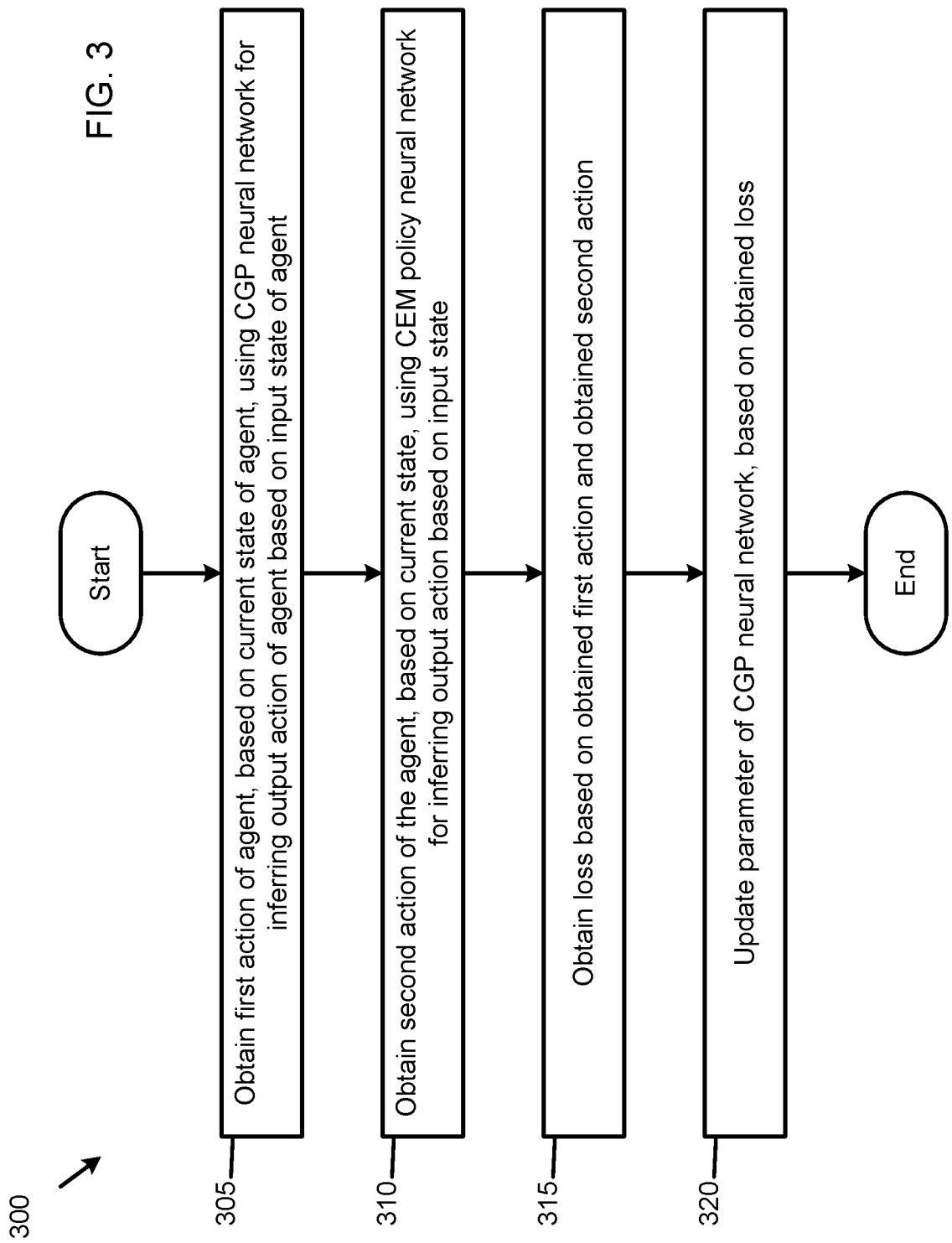
FIG. 3 is a flowchart of a method of training a CGP neural network, according to embodiments.

FIG. 3 is a flowchart of a method 300 of training a CGP neural network, according to embodiments.

Referring to FIG. 3, the method 300 may be performed by the apparatus 100 of FIG. 1.

In operation 305, the method 300 includes obtaining a first action of an agent, based on a current state of the agent, using the CGP neural network for inferring an output action of the agent based on an input state of the agent.

In operation 310, the method 300 includes obtaining a second action of the agent, based on the current state, using a CEM policy neural network for inferring the output action based on the input state. The CEM policy neural network is trained using a CEM and trained separately from the training of the CGP neural network.

In operation 315, the method 300 includes obtaining a loss based on the obtained first action and the obtained second action.

In operation 320, the method 300 includes updating a parameter of the CGP neural network, based on the obtained loss.

Detailed description of the method 300 was described with respect to the apparatus 100 of FIG. 1, and will be omitted herein.

Figure 4:
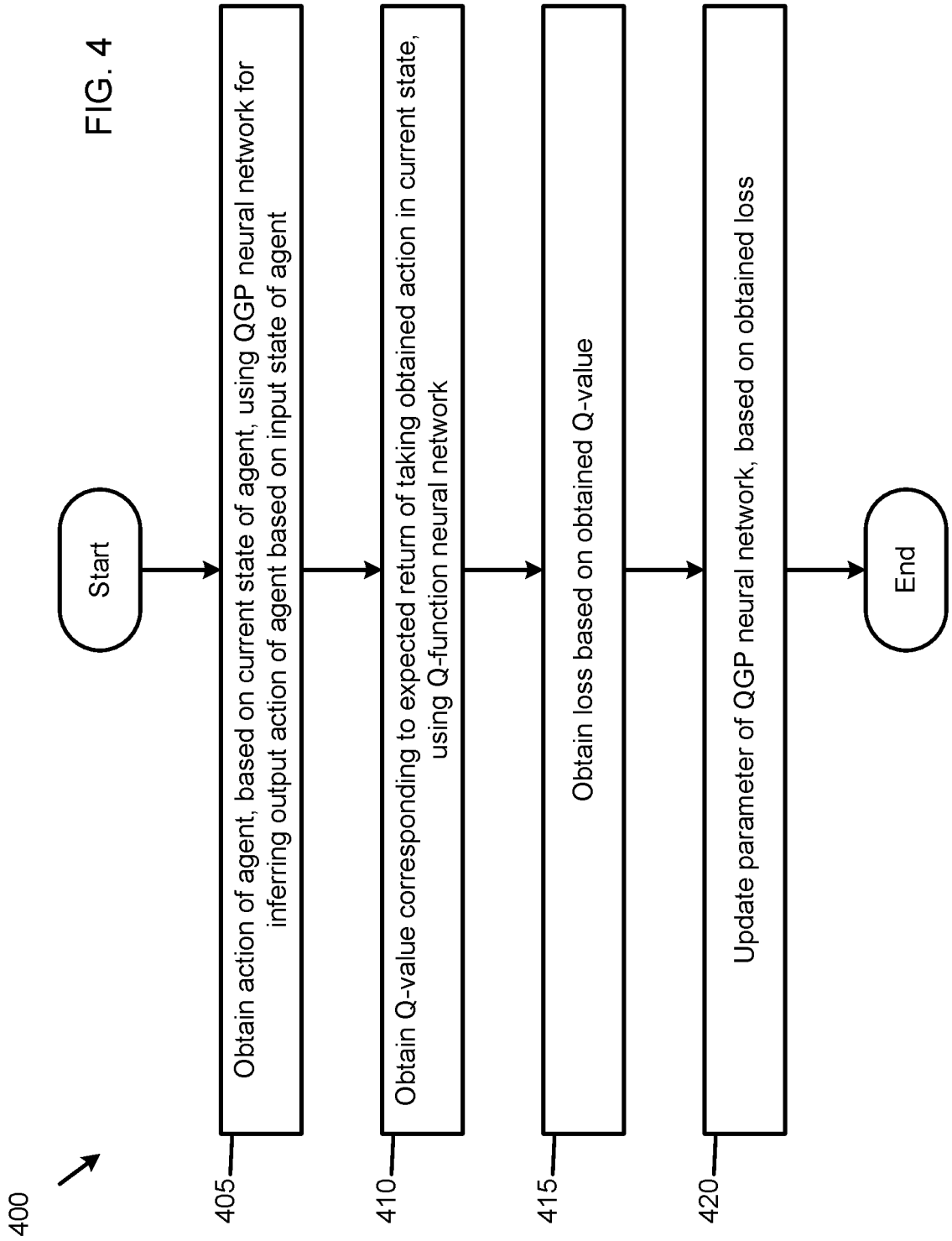
FIG. 4 is a flowchart of a method of training a QGP neural network, according to embodiments.

FIG. 4 is a flowchart of a method 400 of training a QGP neural network, according to embodiments.

Referring to FIG. 4, the method 400 may be performed by the apparatus 200 of FIG. 2.

In operation 405, the method 400 includes obtaining an action of an agent, based on a current state of the agent, using the QGP neural network for inferring an output action of the agent based on an input state of the agent.

In operation 410, the method 400 includes obtaining a Q-value corresponding to an expected return of taking the obtained action in the current state, using a Q-function neural network that is trained separately from the training of the QGP neural network.

In operation 415, the method 400 includes obtaining a loss based on the obtained Q-value.

In operation 420, the method 400 includes updating a parameter of the QGP neural network, based on the obtained loss.

Detailed description of the method 400 was described with respect to the apparatus 200 of FIG. 2, and will be omitted herein.

Figure 5:
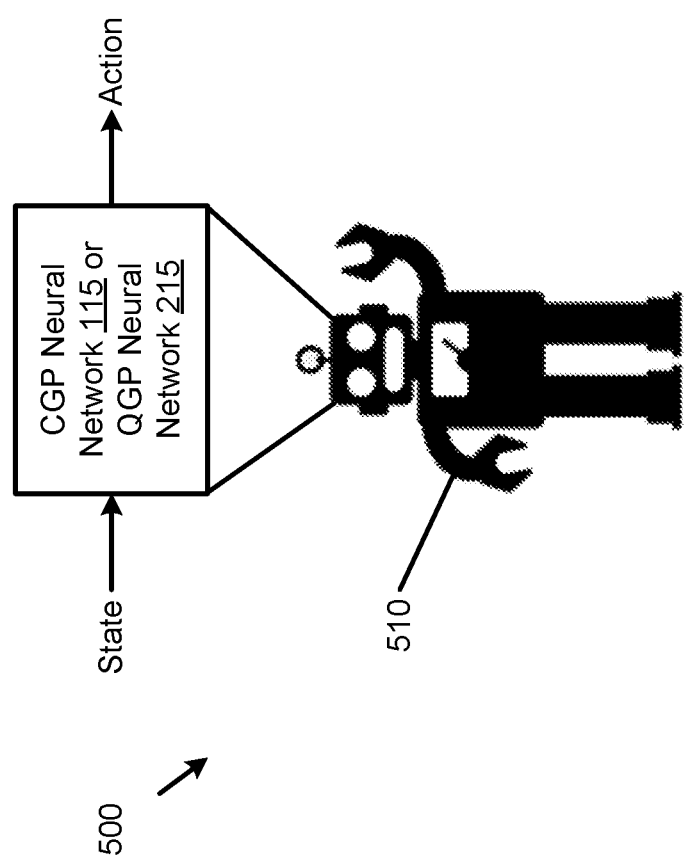
FIG. 5 is a diagram of an apparatus for performing continuous actions.

FIG. 5 is a diagram of an apparatus 500 for performing continuous actions.

As shown in FIG. 5, the apparatus 500 includes the trained CGP neural network 115 or the trained QGP neural network 215 implemented in an electronic device 510 such as, for example, a robot.

The trained CGP neural network 115 or the trained QGP neural network 215 obtains a current state of the electronic device 510, and obtains an action to be performed by the electronic device 510, based on the obtained current state. The electronic device 510 then performs the obtained action. In examples in which the electronic device 510 includes a robot, the current state may include one or more images of an environment of the robot, and the action may include moving an actuator of the robot so that the robot, e.g., moves or picks an item with its hand.

Figure 6:
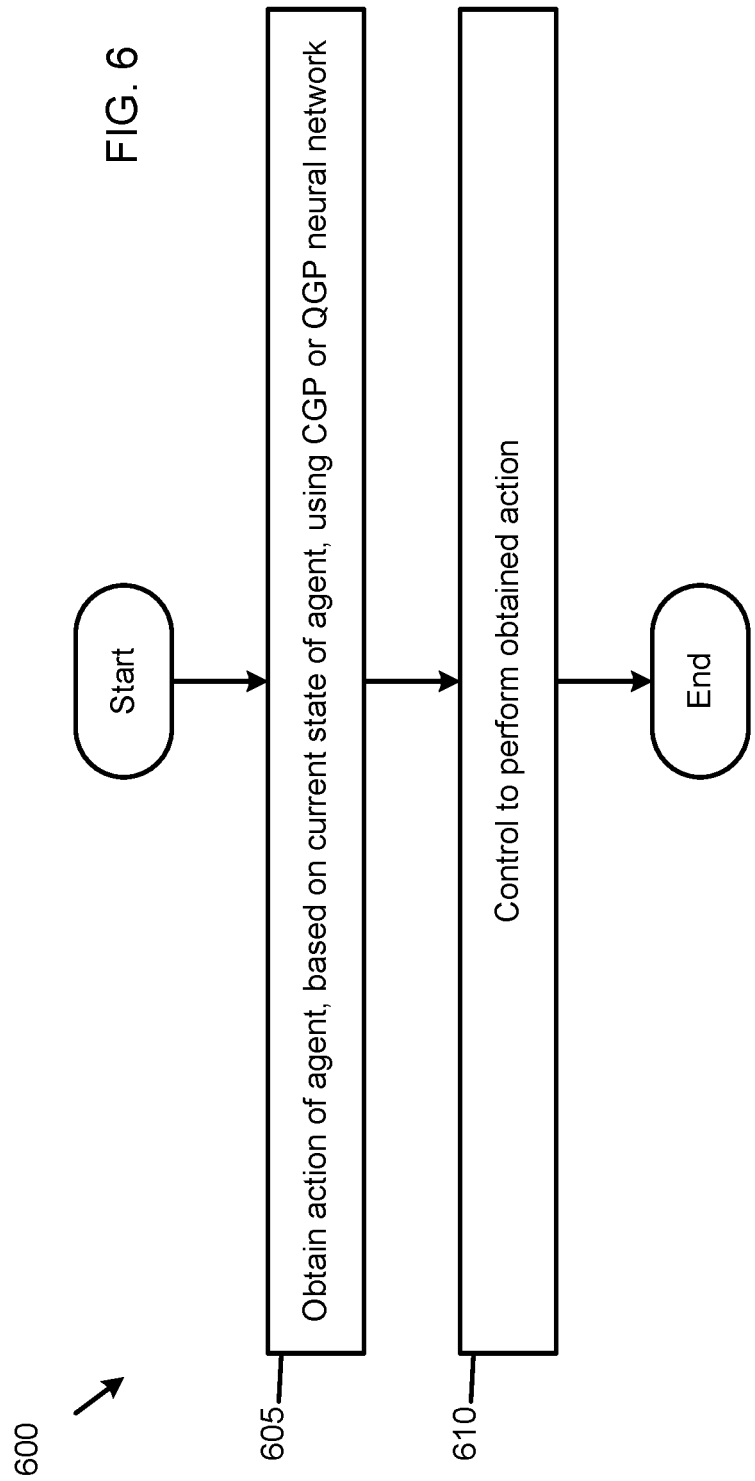
FIG. 6 is a flowchart of a method of for performing continuous actions.

FIG. 6 is a flowchart of a method 600 of for performing continuous actions.

Referring to FIG. 6, the method 600 may be performed by the apparatus 500 of FIG. 5.

In operation 605, the method 600 includes obtaining an action of an agent, based on a current state of the agent, using the trained CGP neural network 115 or the trained QGP neural network 215.

In operation 615, the method 600 includes controlling to perform the obtained action.

Figure 7:
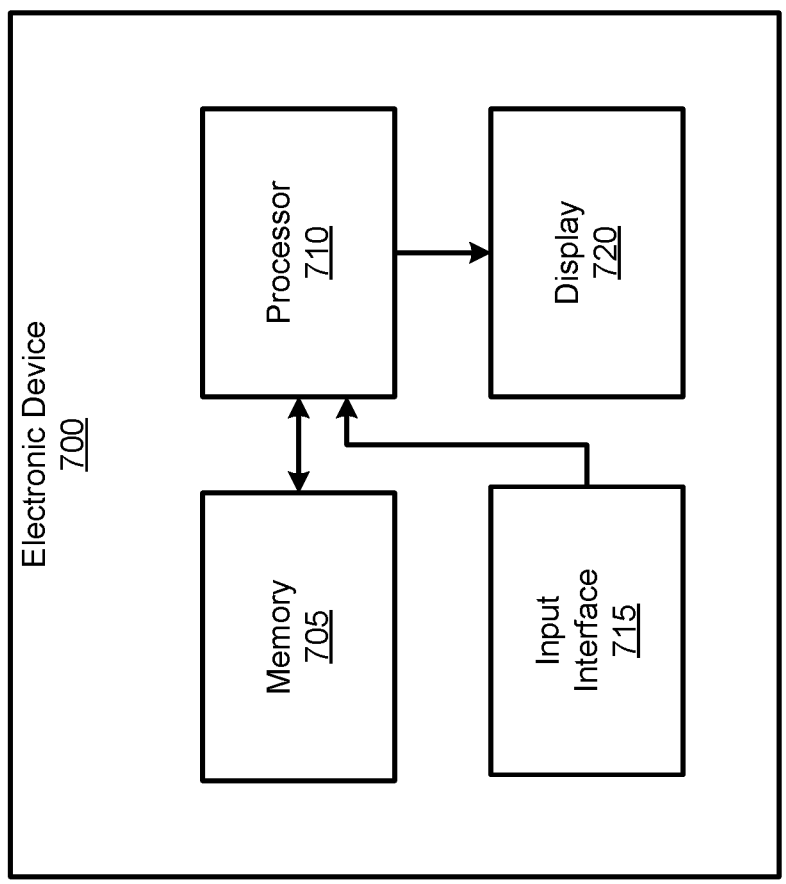
FIG. 7 is a block diagram of an electronic device, according to embodiments.

FIG. 7 is a block diagram of an electronic device 700, according to embodiments.

Referring to FIG. 7, the electronic device 700 includes a memory 705, a processor 710, an input interface 715 and a display 720. The electronic device 700 may be implemented in each of the apparatus 100, the apparatus 200 and the apparatus 500 of FIGS. 1, 2 and 5, respectively.

The processor 710 takes overall control of the electronic device 700. The processor 710 executes one or more programs stored in the memory 705.

The memory 705 stores various data, programs, or applications for driving and controlling the electronic device 700. A program stored in the memory 705 includes one or more instructions. A program (one or more instructions) or an application stored in the memory 705 may be executed by the processor 710.

The processor 710 may perform any one or any combination of operations of the apparatus 100, the apparatus 200 and the apparatus 500 that are respectively shown in FIGS. 1, 2 and 5 and have been described with reference to FIGS. 1-6.

The input interface 715 may receive a user input and/or a data such as a state of an agent. The input interface 715 may include, for example, a touchscreen, a camera, a microphone, a keyboard, a mouse or any combination thereof.

The display 720 may obtain data from, e.g., the processor 710, and may display the obtained data. The display 720 may include, for example, a touchscreen, a television, a computer monitor or any combination thereof.

The block diagram of the electronic device 700 is provided as an example. Each component in the block diagram may be integrated, added, or omitted depending upon specifications of the electronic device 700 that is actually implemented. That is, two or more components may be integrated into one component or one component may be divided into two or more components, as needed. In addition, functions performed by the respective blocks are provided for illustrating the embodiments of the disclosure, and operations or devices of the respective blocks do not limit the scope of the disclosure.

The embodiments of the disclosure described above may be written as computer-executable programs or instructions that may be stored in a medium.

The medium may continuously store the computer-executable programs or instructions, or temporarily store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

A model related to the DNN or CNN described above may be implemented via a software module. When the DNN or CNN model is implemented via a software module (for example, a program module including instructions), the DNN or CNN model may be stored in a computer-readable recording medium.

Also, the DNN or CNN model may be a part of the apparatus 100 and the apparatus 200 described above by being integrated in a form of a hardware chip. For example, the DNN or CNN model may be manufactured in a form of a dedicated hardware chip for AI, or may be manufactured as a part of an existing general-purpose processor (for example, CPU or application processor) or a graphic-dedicated processor (for example GPU).

Also, the DNN or CNN model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

While the embodiments of the disclosure have been described with reference to the figures, it will be understood by those of ordinary skill in the art that various changes in form and details may be made therein without departing from the spirit and scope as defined by the following claims.

What is claimed is:

1. An apparatus for performing continuous actions, the apparatus comprising:
a memory storing instructions; and
a processor configured to execute the instructions to:
obtain, during an inference time, a first action of an agent, based on a current state of the agent, using a cross-entropy guided policy (CGP) neural network; and
control a robot to perform the obtained first action,
wherein the CGP neural network is trained, by an update during the inference time, using a cross-entropy method (CEM) policy neural network for obtaining a second action of the agent based on an input state of the agent,
the CEM policy neural network is trained, during an initial training time, using a CEM and trained separately from the training of the CGP neural network, and
in the CEM used to train the CEM policy neural network during the initial training time, outputs of the CEM policy neural network are sampled and used to parameterize the CEM policy neural network.

2. The apparatus of claim 1, wherein the CGP neural network is trained by obtaining a loss based on the first action and the second action, and by updating a parameter of the CGP neural network, based on the obtained loss.

3. The apparatus of claim 1, wherein the CGP neural network is trained separately from a training of a Q-function neural network for obtaining an output Q-value corresponding to an expected return of taking an input action.

4. The apparatus of claim 3, wherein the Q-function neural network is trained using the CEM, and
in the CEM used to train the Q-function neural network, outputs of the Q-function neural network are sampled and used to parameterize the Q-function neural network.

5. An apparatus for performing continuous actions, the apparatus comprising:
a memory storing instructions; and
a processor configured to execute the instructions to:
obtain, during an inference time, an action of an agent, based on a current state of the agent, using a q-gradient guided policy (QGP) neural network; and
control a robot to perform the obtained action,
wherein the QGP neural network is trained, by an update during the inference time, using a Q-function neural network for obtaining a Q-value corresponding to an expected return of taking the action, and
the Q-function neural network is trained separately from the training of the QGP neural network,
wherein the Q-function neural network is trained, during an initial training time, using a cross-entropy method (CEM), and
in the CEM used to train the Q-function neural network, outputs of the Q-function neural network during the initial training time are sampled and used to parameterize the Q-function neural network.

6. The apparatus of claim 5, wherein the QGP neural network is trained by obtaining a loss based on the Q-value, and by updating a parameter of the QGP neural network, based on the obtained loss.

7. The apparatus of claim 6, wherein the loss is a negative value of the Q-value.

8. A method of performing continuous actions, the method comprising:
obtaining, during an inference time, a first action of an agent, based on a current state of the agent, using a cross-entropy guided policy (CGP) neural network; and
controlling a robot to perform the obtained first action,
wherein the CGP neural network is trained, by an update during the inference time, using a cross-entropy method (CEM) policy neural network for obtaining a second action of the agent based on an input state of the agent,
the CEM policy neural network is trained, during an initial training time, using a CEM and trained separately from the training of the CGP neural network, and
in the CEM used to train the CEM policy neural network, outputs of the CEM policy neural network are sampled and used to parameterize the CEM policy neural network.

9. The method of claim 8, wherein the CGP neural network is trained by obtaining a loss based on the first action and the second action, and by updating a parameter of the CGP neural network, based on the obtained loss.

10. The method of claim 8, wherein the CGP neural network is trained separately from a training of a Q-function neural network for obtaining an output Q-value corresponding to an expected return of taking an input action.

11. The method of claim 10, wherein the Q-function neural network is trained using the CEM, and
in the CEM used to train the Q-function neural network, outputs of the Q-function neural network are sampled and used to parameterize the Q-function neural network.

12. A non-transitory computer-readable storage medium storing instructions to cause a processor to perform the method of claim 8.

13. A method of performing continuous actions, the method comprising:
obtaining, during an inference time, an action of an agent, based on a current state of the agent, using a q-gradient guided policy (QGP) neural network; and
controlling a robot to perform the obtained action,
wherein the QGP neural network is trained, by an update during the inference time, using a Q-function neural network for obtaining a Q-value corresponding to an expected return of taking the action, and
the Q-function neural network is trained separately from the training of the QGP neural network,
wherein the Q-function neural network is trained, during an initial training time, using a cross-entropy method (CEM), and
in the CEM used to train the Q-function neural network, outputs of the Q-function neural network during the initial training time are sampled and used to parameterize the Q-function neural network.

14. The method of claim 13, wherein the QGP neural network is trained by obtaining a loss based on the Q-value, and by updating a parameter of the QGP neural network, based on the obtained loss.

15. The method of claim 14, wherein the loss is a negative value of the Q-value.

16. A non-transitory computer-readable storage medium storing instructions to cause a processor to perform the method of claim 13.

* * * * *